Jan. 6, 1959  C. W. GRAYBILL ET AL  2,867,402
SUPPORT
Filed July 15, 1955

INVENTORS
CLARENCE W. GRAYBILL
& SILAS H. GRAYBILL
BY
McMorrow, Berman & Davidson
ATTORNEYS 
United States Patent Office 2,867,402
Patented Jan. 6, 1959

2,867,402

SUPPORT

Clarence W. Graybill and Silas H. Graybill, Conestoga, Pa.

Application July 15, 1955, Serial No. 522,304

1 Claim. (Cl. 248—226)

This invention relates to supports and particularly to the type of support used for suspending an animal carcass while it is being skinned.

An object of the invention is to provide a support for an animal carcass while it is being skinned, which is adapted to be mounted firmly upon an automobile bumper.

Another object of the invention is to provide a support for an animal carcass while it is being skinned which may be easily mounted upon and dismounted from an automobile bumper and which may be separated into sections when not in use for convenience in transportation.

Other objects and advantages of the invention will appear from the following description considered in conjunction with the attached drawings in which.

Figure 1:
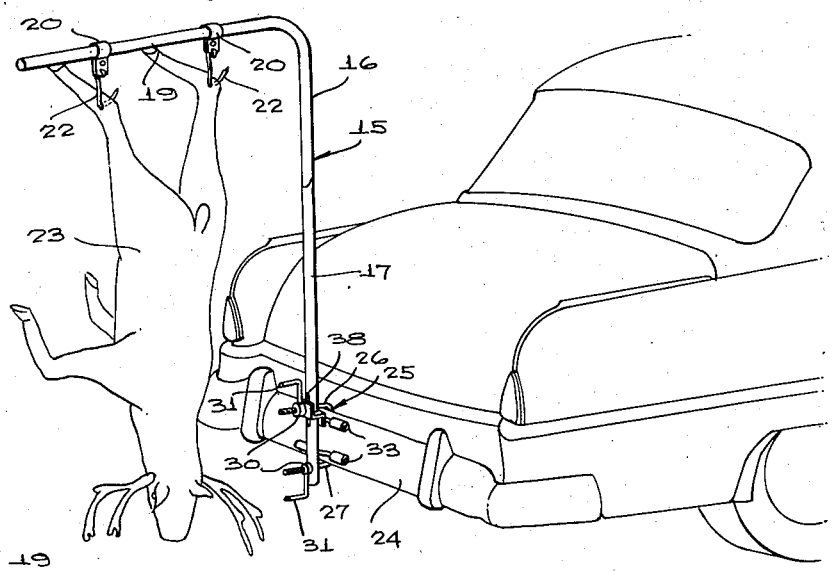
Figure 1 is a perspective view of the support of the present invention attached to the bumper of an automobile and supporting an animal carcass.
Figure 2:
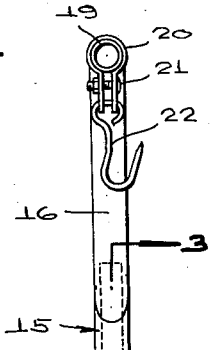
Figure 2 is an end elevational view of the support of the present invention, on an enlarged scale.
Figure 4:
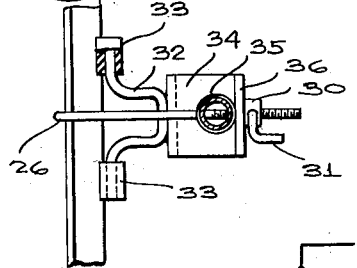
Figure 4 is a view taken along the line 4—4 of Figure 3.

Referring to the drawings, the reference numeral 15 designates generally an upstanding post. The post 15 is hollow and consists of detachable upper and lower sections 16 and 17 respectively, having complementary shaped diagonal abutting ends which fit together conformably when the sections are placed end to end. A pin 18, fixedly secured in the open end of the section 16 by welding or similar means, projects downwardly from the end of the section and seats in the upper end of the section 17 to hold the two sections in end to end alignment.

Supported from the top of the post 15 is a horizontally disposed arm 19. Specifically, the arm 19 is formed integrally with the upper section of the post 15 and is bent at right angles thereto.

Carried by the arm 19 are means for suspendingly supporting an animal carcass from the arm 19. The means consist of a pair of strips 20, arranged in spaced relation and each bent around the arm 19 with its end portions fastened together by connecting means 21 and a hook 22 depending from the strip 20. The strips 20 may be moved slidably along the arm 19 to selected positions thereon and the hooks 22 may be hooked through portions of an animal carcass 23 to suspend the carcass 23 from the arm 19.

Upon the post 15, adjacent its lower end, is means for attaching the post 15 to a horizontally disposed supporting member, such as a bumper 24 of an automobile, generally designated 25. The means comprises a pair of spaced hooks 26 and 27 and a pair of spaced contact elements 28 and 29.

Figure 3:
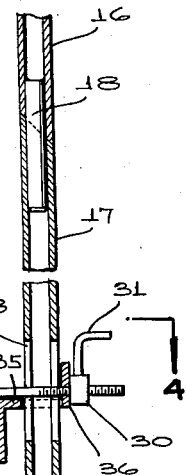
Figure 3 is a view taken along the line 3—3 of Figure 2.

The hooks 26 and 27 are arranged transversely of the post 15 and are connected to the post 15 for movement therealong relative to each other. The hook 26 is adapted to embracingly engage the upper edge portion of the bumper 24 and the hook 27 is adapted to embracingly engage the lower edge portion of the bumper 24, as shown in Figure 3. Each of the hooks 26 and 27 extends slidably through the post 15 and its shank end projects exteriorly from the portion of the post 15 remote from the head of the hook. A nut 30, having a crank arm 31 projecting transversely therefrom, is in threadable engagement with the projecting shank end of each of the hooks 26 and 27 for moving the hooks 26 and 27 transversely of the post 15.

Each of the contact elements 28 and 29 is carried by the post 15 and coacts with the adjacent hooks, 26 and 27, respectively, the contact elements 28 and 29 being adapted to engage the inner face of the supporting member or bumper 24. Each of the elements 28 and 29 embodies a U-shaped bar 32 which has the free end portions of its legs bent away from each other and covered with casings 33 of resilient material, the casing covered portions being adapted to bear against the surface of the bumper 24. In the element 28, the bight of the U-shaped member 32 is fixedly secured to and centrally of the depending flange 34' of an angle plate 34. The horizontally disposed intermediate portion 45 of the plate 34 is provided with an aperture 35 by means of which the plate is slidably mounted upon the post 15.

A flange 36 projects upwardly from the intermediate portion 45 of the plate 34 at the side thereof remote from the flange 34', is interposed between the nut 30 and the adjacent portion of the post 15 and is threadably engaged upon the shank end of the hook 26 to connect the element 28 to the hook 26. The post 15 is provided with a horizontally extending closed slot 38 to accommodate the sliding movement of the hook 26 along the post 15 as the plate 34 is adjusted to a selected position longitudinally of the post.

In the element 29 the bight of the U-shaped member 32 is connected to the post 15 by a neck 37 which is fixedly secured to the post 15. Although in the accompanying drawings the hook 27 and element 29 are fixed against longitudinal movement along the post 15, they may, if desired, be made slidable therealong in the manner of the hook 26 and the element 28.

When not in use, the support of the present invention is normally separated into two parts, the upper section 16 of the post 15 and the arm 19 connected thereto being separated from the lower section 17 of the post 15. As thus separated, the parts of the support are of convenient size for being carried within the trunk of an automobile or elsewhere thereon. When the animal is to be skinned, the lower section of the post 15 is taken from its place of carriage and secured in upright position to either the front or rear bumper of the automobile. To secure the section 17 to the bumper 24, the nut 30 is loosened upon the hook 26 until the hook 26 and the connected contact element 28 may be slid upwardly along the lower section 17 to the upper limit of the slot 38.

The section 17 is then moved adjacent the bumper 24 and the hook 27 is moved outwardly from the section 17 by means of its nut 30 and is placed in embracing engagement with the lower edge portion of the bumper 24. The hook 26 and element 28 are then moved downwardly along the section 17 until the hook 26 embracingly engages the upper edge portion of the bumper 24. The nuts 30 of both hooks 26 and 27 are then tightened to bring the hooks 26 and 27 and the contact elements 28 and 29 into tight clamping relation against the bumper 24 to support the section 17 rigidly and firmly in an upstanding position upon the bumper 24. The upper section 16 of the post 15 and the connected arm 19 are then raised and the pin 18 projecting from the lower end of the section 16 is seated in the upper end of the section 17 to secure the sections 16 and 17 together. The abutting diagonal ends of the sections 16 and 17 cause the section 16 to rest upon the section 17 in such a position that the arm 19 projects outwardly away from the bumper 24. As soon as the section 16 and arm 19 are in place, the hooks 22 may then be spaced along the arm 19 at an appropriate distance for supporting the animal to be skinned and the animal 23 may then be hung upon the hooks 22 in position for skinning.

When the support is to be taken down, the carcass is disengaged from the hooks and the upper section 16 and the arm 19 are lifted from the section 17. The nuts 30 are then loosened, permitting the hook 26 and the element 28 from engagement with the bumper 24 and the section 17 to be disengaged therefrom.

It will be obvious that the support of the present invention provides a simple, easily set up and easily dismounted support upon which an animal carcass may be hung for skinning wherever an automobile is available to provide a bumper as a base for the support. By virtue of the clamping engagement provided by the adjustable hooks 26 and 27 and the coacting contact elements 28 and 29, the support may be held rigidly in the upright position to provide a firm hanger for the carcass.

Figure 5:
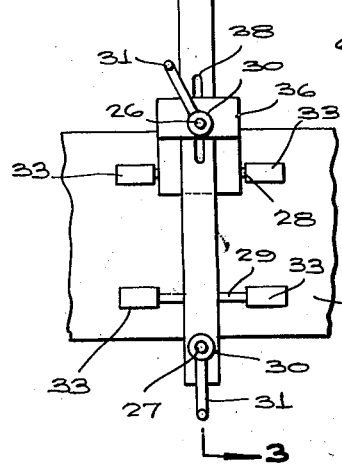
Figure 5 is a perspective view of a different form of a portion of the attaching means.

In Figure 5, the hook bolt 50 has its externally threaded portion 52 received through the bore of a length of guide pipe 54 secured, as by welding, upon the upper surface of the intermediate portion 56 of an angle plate, generally indicated at 58, similar to the plate 34. The shank portion 60 of the hook bolt 50 extends outwardly from the end of the guide 54 in a direction away from the upstanding flange 62 of the plate 58, and terminates in a hook 64 adapted to releasably engage an automobile bumper in the manner described in connection with hook 26.

The intermediate portion 56 is provided with a central opening transversely therethrough to receive the lower section 17 of the post 15 therein and permit longitudinal sliding movement of the plate 58 on the post. The guide pipe 54 extends transversely of the intermediate portion of the plate 58 and to one side of the post. This will permit elimination of the slot 38 shown in the form of Figures 1–4 and thereby strengthening the post 15 since the slot for accommodation of the hook bolt has been eliminated.

A nut 66 is threadingly engaged upon the threaded portion 52 of the hook bolt extending outwardly from the flange 62 through a suitable opening in the flange and projecting away from the side of the flange remote from the side from which the guide pipe 54 extends. A crank arm or handle 68 projects laterally from the nut 66 whereby the nut can be moved along the bolt portion 52 toward and away from the adjacent side of the flange 62. The shank portion 60 of the bolt is laterally offset, as at 70, in a direction toward the post 15 to permit a degree of adjustment in engaging bumpers of different sizes and contours.

Upon the outer face of depending flange 72 of the plate 58, extending along the side of the intermediate portion 56 remote from the side from which the flange 62 extends, the bight portion 74 of a U-shaped contact element or gripping member, generally indicated at 76, is secured, as by welding. The opposite legs 78 and 80 of the contact element extend outwardly from the bight portion 74 in a direction away from the flange 72 and substantially parallel to the hook bolt 50. Each leg 78 and 80 is provided with a laterally projecting foot 82 at the free end thereof. Each foot is provided with a sheath or casing 84 covering the foot adapted to bear against the surface to which the attaching means is to be applied. Thus, the contact element 76 is identical in purpose and construction to the contact element 28 of Figures 1–4.

The hook bolt 50 and contact element 76 will function in cooperation with the hook bolt 27 and contact element 29, carried adjacent the lower end of the post 15, in the same manner as described in connection with the bolt 26 and element 28 of Figures 1–4 to attach and secure the post upon the bumper of automobile.

What is claimed is:

A support for attachment to an automobile bumper having top and bottom edges, comprising an upstanding post; article-supporting means thereon; and means for clamping the post to a bumper including first and second hooks, said hooks including elongated shanks projecting laterally from and spaced longitudinally of the post in approximate perpendicularity thereto with the hooks in confronting relation for engagement one with the top and the other with the bottom edge of the bumper, and first and second bumper-contacting elements in the space between the hooks, said first and second elements including bars projecting laterally from the post in planes parallel to said shanks, at locations spaced equal distances from the first and second hooks respectively, longitudinally of the post, the first hook and the first element being connected to the post against movement longitudinally of the post and the second hook and second element being connected to the post for conjoint adjustment longitudinally of the post, each of said bars being formed to a U-shape so as to include a bight and legs projecting from the bight, the bight of each bar being the portion of the bar nearest the post with the legs projecting outwardly from the post and including free end portions covered with resilient material and extending away from each other so as to bear against the adjacent surface of the bumper, the legs of each bar being symmetrically disposed at opposite sides of and in laterally spaced relation to the hook adjacent thereto, for engagement of said free end portions of each bar against the bumper at locations spaced longitudinally of the bumper from and at opposite sides of the location at which the bumper is contacted by the adjacent hook.

References Cited in the file of this patent

UNITED STATES PATENTS

| | | |
|---|---|---|
| 1,906,369 | Christie | May 2, 1933 |
| 2,379,994 | Schwinn | July 10, 1945 |
| 2,470,878 | Tate | May 24, 1949 |
| 2,538,493 | Askins | Jan. 16, 1951 |
| 2,645,393 | Campbell | July 14, 1953 |
| 2,693,015 | Richards et al. | Nov. 2, 1954 |